No. 784,597. PATENTED MAR. 14, 1905.
F. P. SMITH.
APPARATUS FOR PURIFYING SEWAGE AND CONSUMING GARBAGE.
APPLICATION FILED OCT. 30, 1902.
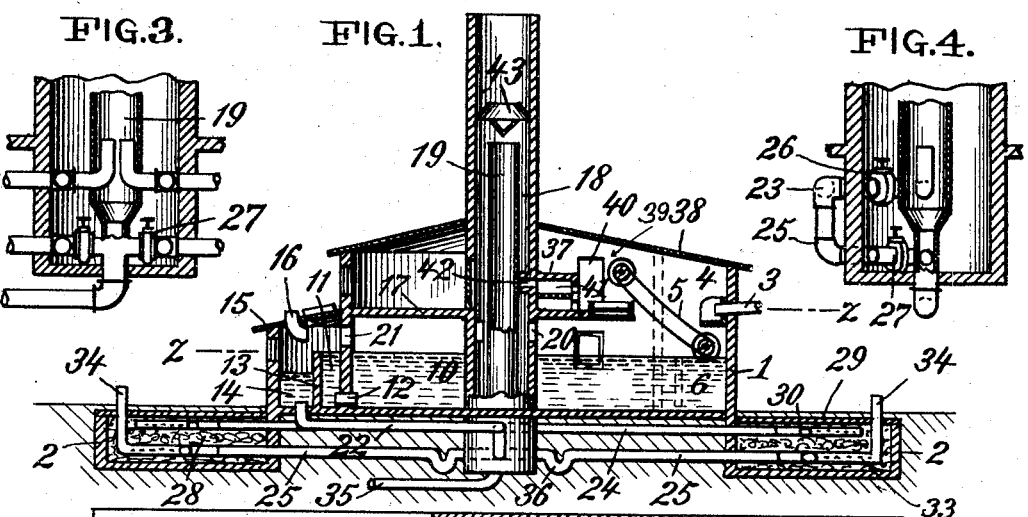
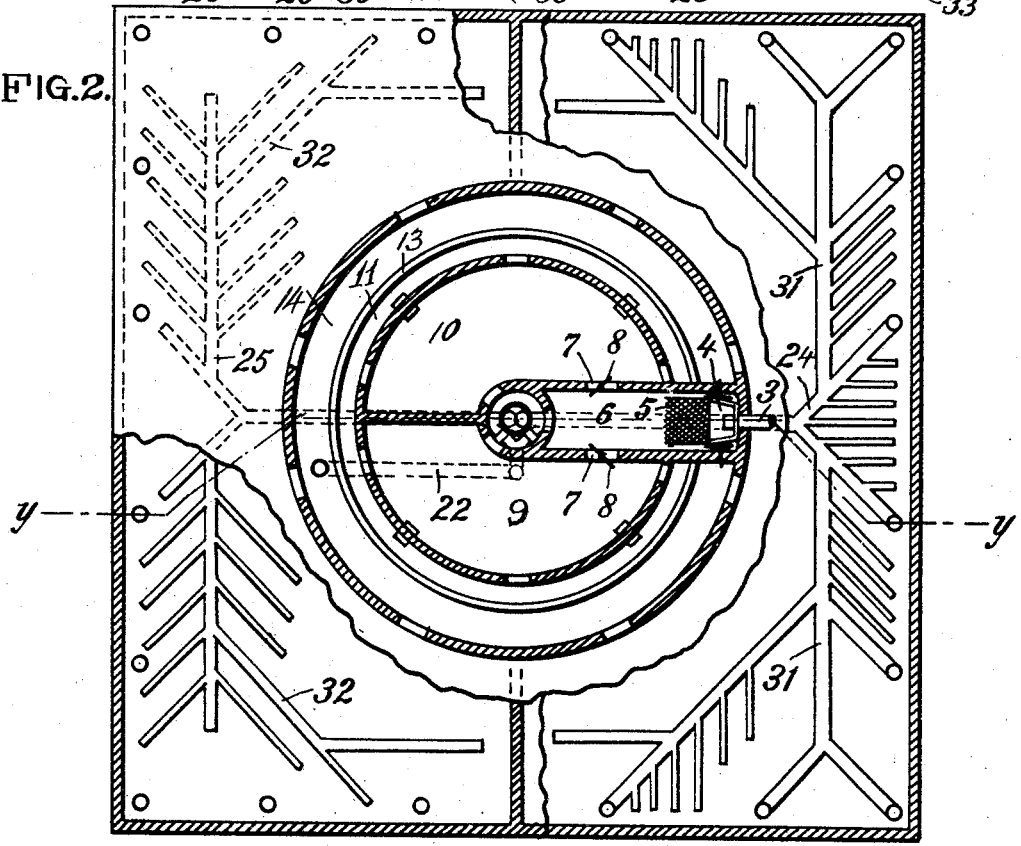
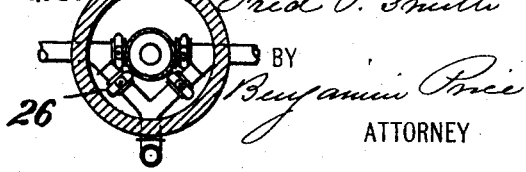
WITNESSES:
John H. Duvall
Harold T. Lyman
INVENTOR,
Fred P. Smith
BY
Benjamin Price
ATTORNEY No. 784,597.

Patented March 14, 1905.

UNITED STATES PATENT OFFICE.

FRED P. SMITH, OF NEW YORK, N. Y., ASSIGNOR TO THE MUNICIPAL ENGINEERING COMPANY, OF NEW YORK, N. Y., A CORPORATION OF DELAWARE.

APPARATUS FOR PURIFYING SEWAGE AND CONSUMING GARBAGE.

SPECIFICATION forming part of Letters Patent No. 784,597, dated March 14, 1905.

Application filed October 30, 1902. Serial No. 129,374.

*To all whom it may concern:*

Be it known that I, FRED P. SMITH, of the city, county, and State of New York, have invented a new and useful Improvement in Apparatuses for Purifying Sewage and Consuming Garbage, of which the following is a full description.

The accompanying drawings illustrate the invention, of which—

Figure 1 is a vertical section of the apparatus on line *y y* of Fig. 2. Fig. 2 is a plan view of same on line *z z* of Fig. 1; Figs. 3 and 4, vertical sectional views of the chimneys and pipes; Figs. 5 and 6, plan views of the pipe connections.

1 1 are the walls inclosing the reservoirs or tanks of the apparatus, and 2 2 are the walls inclosing the aerobic beds, wherein the air is supplied for the liquid and also for the invigoration of the aerobic bacteria therein.

3 is a pipe leading from a system of sewage, provided with a spreader 4 for the liquid.

5 is a screen to catch the polluted liquid falling from the spreader and retain the solid and semisolid matter and allow the liquid to pass through.

6 is a reservoir to receive the liquid from the screen and allow the sediment therein to settle. It is provided with the overflow-ports 7 7, which may be supplied with the valves or gates 8 8, one of which may be left open and the other closed at will to allow the liquid to flow through one of the ports and prevent its exit from the other, or both may be opened, as desired.

9 and 10 are tanks to receive the overflow from reservoir 6, which falls therein until filled, and then receive the liquid from the reservoir over its surface. In these tanks the anaerobic bacteria do their work of attacking the organic matter therein and convert it into matter soluble in water and into gases which rise to the surface of the liquid and escape in bubbles. These tanks have their outlet at the bottom and discharge their contents into the bottom of a receptacle 11 through the openings 12. The wall 13 around the receptacle 11 is, in effect, a dam over which the liquid flows and falls into a vessel 14. This fall may be as high as desired and breaks the volume of the liquid, thus preparing it to receive air for aeration to fit it for introduction into the beds in which the aerobic bacteria perform their work without injury to the bacteria. The height of the dam 13 regulates the liquid-level in 6, 9, 10, and 11. A roof 15 covers the tanks 11 and 14, and through the roof I have introduced the air-inlets 16 to aerate the liquid falling over the dam. Above the tanks 9 and 10 is placed the floor 17.

18 is an outer chimney and 19 an inner chimney.

The space between the floor 17 and the liquid in tanks 9 and 10 forms a chamber wherein are gathered the escaping gases from those tanks which pass through the opening 20 into the outer chimney 18. This space serves also to collect and pass off the air admitted over tanks 11 and 14, which passes through the openings 21 into the chamber and to the outer chimney through openings 20. The tank 14 serves to collect and retain the liquid until a dose or charge is acquired. This charge is discharged from the bottom of the tank through pipe 22. The pipe 22 branches. One branch, 23, leads to the upper pipe 24 and the other branch to the lower pipe 25. The branches are furnished with cocks 26 27 to close or open when required.

Surrounding the apparatus is a large receptacle 28, arranged to receive the liquid from tank 14 and discharge it. The receptacle is provided with suitable beds of coke, coarse gravel, or other material, whose purpose is to harbor aerobic bacteria. The material should be coarse enough to allow free passage of the liquid therethrough. The receptacle is provided with an air-tight cover 29, and in order to secure an even temperature therein I have placed over the cover a turf or sod 30. The two pipes 24 25 enter the receptacle one above and the other below the aerobic beds. Within the receptacle both pipes have branches 31 32, and the pipes and branches are perforated, as shown at 33. The upper pipe 24 ends within the receptacle; but the pipe 25 extends upward and through the cover thereof to the atmosphere, as shown at 34. The other ends of both the pipes open into the inner chimney 19, and from the pipe 25 projects a drain or discharge pipe 35. The liquid from tank 14 through pipe 24 is discharged over the aerobic beds and is evenly distributed thereon through the perforations in that pipe and its branches. This liquid having been already aerated it is in suitable condition for the work of the aerobic bacteria residing in the beds. The pipe 25 is provided with the gooseneck trap 36, whose purpose is to prevent the escape of air into chimney 19 through the pipe 25 when it is desired to draw the air upwardly through the beds in the receptacle and discharge it through pipe 24. In providing a sealed aerobic bacterial bed for the oxidization or nitrification of sewage matter this matter should be thoroughly aerated at frequent intervals. The air-inlet 34, the conduits 24 and 25, with their perforations, and chimney 19, all contribute to the thorough aeration of the liquid and the aerobic beds.

When the liquid from pipe 24 has filled or partly filled the receptacle 28, it is obvious that no air can enter the receptacle through the inlet 34, because that inlet is sealed by the liquid therein. Now if the cock 27 be opened and the liquid from the receptacle be discharged through the drain-pipe 35 the air enters through the inlet 34 into the pipe 25, passing out through the perforations in that pipe and its branches and up through the beds. At this stage the tank 14 has been relieved of its charge and very little liquid from that tank occupies the pipe 24, so that the air passing through the beds enters through the perforations in pipe 24 and is drawn out through the chimney 19. When the receptacle is again filled with liquid, it will cover the pipe 25, closing the lower end of inlet 34 and preventing the escape of foul odors therethrough. I desire also to use the aerobic beds as continuous and constant percolating-beds. To accomplish this purpose, the operator will adjust the valve 26 so as to allow the liquid from tank 14 to enter the receptacle 28 without filling the pipe 24. The cock 27 is then opened to permit a constant discharge of the liquid from the receptacle. The liquid thus distributed over the beds percolates therethrough and out through 25 without filling the beds, and during this operation the air is being constantly drawn upwardly through perforations in pipe 25 and through the beds into pipe 24 and out through the inner chimney 19. Again, by closing cock 27 and allowing the liquid to enter the receptacle through pipe 24 without filling the pipe the sewage as it fills the moat forces the contained air upward through 24 into chimney 19. In passing the air outward through the same conduit which serves as a passage for the liquid the air aerates the liquid in the pipe. In using the apparatus in the way just described the beds are used as downward intermittent-contact beds. The apparatus also affords equal facilities for using the beds as upward intermittent contact beds, and this is accomplished by admitting the sewage to the receptacle 28 through pipe 25 and gooseneck air-trap 36, when after the contact period has expired the liquid is withdrawn by opening valve 27 through drain-pipe 35. In each of the above cases the chimney 19 is open only to the empty beds, and the period of aeration of the receptacle is controlled by the inflow and outflow of the liquid. When the beds are drained, there will always remain therein a certain quantity of the liquid held by capillary attraction, and this might sometimes act as a trap to hold said air in the bottom of the receptacle and prevent it escaping upwardly through the beds; but it is obvious that by the arrangement and manipulation of the apparatus as above described the liquid, whether entering the receptacle through pipe 24 or pipe 25, will rise through the beds and carry with it any air so caught to be discharged through the pipe 24 into chimney 19. In any case it is clear that there can be no escape of the air entering the receptacle except through the beds. Upon this floor 17 I have placed a garbage-burning furnace 37. Over the floor and furnace is a roof 38, which leaves a room 39 between the floor and the roof. The room is provided with a door 40, through which the garbage may enter as it arrives and be throw upon the furnace-grate through the opening 41. The outlet 42 for the products of combustion above the grate leads to the inner chimney 19, wherein it induces a strong draft drawing up through this chimney, the air passing through the aerobic beds in the receptacle 28, while the heat from chimney 19 induces a draft in the chimney 18. Above the chimney 19 and within chimney 18 is located the deflector 43. At the top of chimney 19 the foul odors from chimney 18 meet and mingle with the air and flame from 19 and are there consumed.

From the above description it will be seen that this apparatus is a complete sewage-purifier and garbage-burner, wherein all foul odors from either or both are prevented from polluting the surrounding atmosphere.

What I claim, and desire to secure by Letters Patent, is—

1. In an apparatus for purifying sewage and consuming garbage, a septic-tank wherein the crude sewage is clarified, and means for collecting the odors and gases escaping therefrom, in combination with a furnace, two chimneys one located inside of the other, an outlet for the heat from the furnace to the inner chimney, an outlet for the collected odors and gases into the outer chimney and means for incinerating the odors and gases at the top of the inner chimney and within the outer one.

2. In an apparatus for purifying sewage and consuming garbage, a septic-tank wherein the crude sewage is clarified, a purifying-receptacle to receive the clarified liquid from the septic-tank, and two chimneys one located inside of the other in combination with a furnace provided with an outlet for its flame to the inner chimney, devices for drawing the air through the purifying-receptacle into the inner chimney, means for passing the gases and odors from the septic-tank into the outer chimney, and means for incinerating said gases and odors by the heat from the inner chimney.

3. In an apparatus for purifying sewage and consuming garbage, a septic-tank wherein the crude sewage is clarified, a purifying-receptacle to receive the clarified liquid from the tank, a floor over the septic-tank, and a covered room above the floor, in combination with a furnace located in the room, two chimneys one located inside of the other, an opening above the grate of the furnace to the inner chimney, open connections from the inner chimney to the purifying-receptacle, means for discharging the gases and odors from the septic-tank through the outer chimney, and means for incinerating these gases at the top of the inner chimney.

In testimony whereof I, the said FRED P. SMITH, have signed my name to this specification, in the presence of two subscribing witnesses, this 6th day of October, 1902.

FRED P. SMITH.

Witnesses:
JOHN H. DUVALL,
M. TURNER.